Nov. 23, 1943.  W. J. OPOCENSKY  2,334,950
INCLINATION INDICATING INSTRUMENT
Filed April 27, 1942  5 Sheets-Sheet 1

Inventor
Willard J. Opocensky
By Jack A. Ashley
Attorney

Nov. 23, 1943.　　　W. J. OPOCENSKY　　　2,334,950
INCLINATION INDICATING INSTRUMENT
Filed April 27, 1942　　　5 Sheets-Sheet 2

Inventor
Willard J. Opocensky
By Jack Athley
Attorney

Nov. 23, 1943.  W. J. OPOCENSKY  2,334,950
INCLINATION INDICATING INSTRUMENT
Filed April 27, 1942   5 Sheets-Sheet 5

Inventor
Willard J. Opocensky

Attorney

Patented Nov. 23, 1943

2,334,950

UNITED STATES PATENT OFFICE 2,334,950

INCLINATION INDICATING INSTRUMENT

Willard J. Opocensky, Long Beach, Calif., assignor of one-half to Eastman Oil Well Survey Company, Dallas, Tex., a corporation of Delaware, and one-half to Eastman Oil Well Survey Corporation, Long Beach, Calif., a corporation of California Application April 27, 1942, Serial No. 440,611

20 Claims. (Cl. 33—205.5)

This invention relates to new and useful improvements in inclination indicating instruments.

One object of the invention is to provide an improved instrument which may be lowered into the well bore and which will accurately indicate and record the deviation or "drift" of said bore from the vertical, whereby the angular disposition of the bore, either during drilling or subsequent thereto, may be determined.

An important object of the invention is to provide an improved inclination indicator, wherein the record is made by a mechanical marking means, which is so arranged that any movement of either the instrument or plumb bob during the recording operation will be visibly indicated on the record, whereby accuracy of the deviation indication is assured.

A particular object of the invention is to provide an improved mechanical inclination indicator having means for marking the record more than once with a predetermined interval of time between the marking operations, whereby when the instrument and plumb bob are stationary during the marking operations, as is necessary for accurate indication, all of the marks are superimposed to provide a single indication; any movement of the plumb bob or instrument between or during the marking operations resulting in the individual marks being at different positions or locations on the record, with the result that the operator is advised that an inaccurate indication has been made.

Another object of the invention is to provide an instrument including a plumb bob having a marking element and a record member normally spaced from the element, together with improved means for imparting a reciprocating movement to the record member to engage said member with the element to mark the disk and thereby record the position of the plumb bob with respect to the center of the element, said last named means being actuated at two distinct times with a predetermined interval therebetween, whereby a double marking of the record member is effected.

A further object of the invention is to provide an improved instrument, of the character described, wherein the operating mechanism for the movable record member is locked against movement during lowering of the instrument into the well and prior to the operation thereof and is also locked against movement subsequent to operation and while being removed from the well, whereby the possibility of the instrument being accidentally actuated is obviated.

Still another object of the invention is to provide an improved instrument, of the character described, wherein an improved time-controlled mechanism is employed for imparting movement to the record member to carry out the marking operation, said mechanism having an improved resetting apparatus which permits resetting of the actuating mechanism and the timing mechanism without imparting movement to the record member during such resetting, whereby damage to said member or to the operating parts thereof, which may occur during the resetting operation is avoided.

A further object of the invention is to provide a device, of the character described, having an improved arrangement for resetting the locking bar with respect to the timing cam, whereby damage to the timing mechanism, due to the locking bar hanging, binding or becoming jammed, is obviated.

A construction designed to carry out the invention will be hereinafter described together with other features of the invention.

The invention will be more readily understood from a reading of the following specification and by reference to the accompanying drawings, wherein an example of the invention is shown, and wherein:

In the drawings, the numeral 10 designates an elongate, tubular casing which is preferably constructed of two main sections 11 and 12 which are connected to each other by means of a coupling collar or block 13. The upper section 11 is formed with an internal annular flange 14 which is located at its upper portion and the extreme upper end of the section is closed by a suitable plug or cap 15. A plumb bob 16 is mounted within the upper section 11 and is provided with an upwardly extending stem 17, the upper end of which is pivotally mounted by means of a cardian suspension 18 which is supported upon the internal shoulder 14. As is well known, a cardian suspension permits a universal movement of the element supported thereby and thus the plumb bob 16 is maintained in a vertical position, regardless of the inclination of the tubular casing 10.

The plumb bob may be of any desired construction but it is preferable that it be formed with a depressible marking element or stylus 19 which projects from the lower end thereof. The marking element is normally maintained in a lowered position by means of a coiled spring 20 which is confined within an axial bore 21 formed in the plumb bob. Although not essential it is desirable that the marking element or stylus 19 be rotated as it is depressed and to effect such rotation, the stylus 19 is formed with a lug 22 which rides within a helical groove 23 provided in a sleeve 24 which is mounted within the bore 21 of the plumb bob. When the marking element or stylus is depressed, the coaction between the pin or lug 22 and the helical groove 23 imparts a rotation to the marking element.

Figures 1, 4, 5, 18, 19, 20, 21, 22:
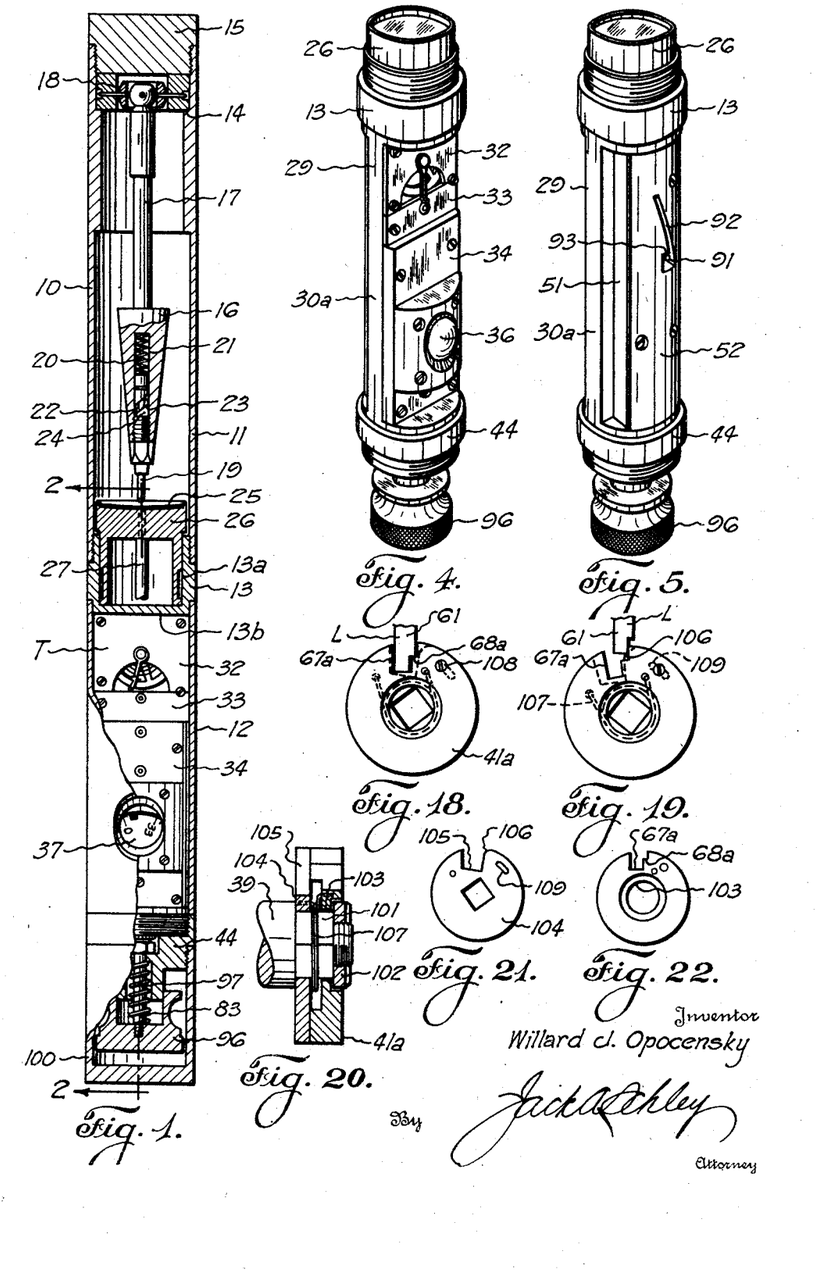
Figure 1 is a view, partly in section and partly in elevation, of an inclination indicating instrument, constructed in accordance with the invention.
Figure 4 is an isometric view of the operating and timing assembly, with the same removed from the instrument case or housing.
Figure 5 is a similar view of the side opposite that shown in Figure 4, Figures 6—7, 8—9, 10—11, 12—13, and 14—15 are schematic views of the operating mechanism for the index or record member, said views illustrating the various positions of said mechanism during actuation thereof.
Figure 18 is an elevation of a modified form of timing cam arrangement which co-acts with the locking bar.
Figure 19 is a similar, showing the cam partially rotated to effect lifting of the bar from the notch in said cam.
Figure 20 is a transverse, vertical sectional view, taken the cam arrangement.
Figure 21 is an elevation of the rear or inner disk of the cam arrangement.
Figure 22 is an elevation of the outer disk thereof.

The plumb bob 16 overlies the record member or disk 25 which is constructed of a coated paper or other suitable material and which is mounted within the recessed upper end of a circular support or carrier 26. The support or carrier 26 is slidable vertically within the bore 13a of the coupling 13 and said coupling is provided with a bottom 13b which extends transversely across the casing and which forms a stop for limiting the downward movement of the support or carrier. Normally, the support or carrier 26 is in a position as shown in Figure 1 with the record disk 25 spaced from the lower pointed end of the marking element or stylus 19. When the carrier 26 is moved upwardly, the record disk 25 is moved into engagement with the stylus or marking element and will serve to depress the stylus under tension of the coiled spring 20. Such depression of the stylus causes a rotation thereof, whereby the pointed end of said stylus forms a dot or mark on the record disk 25. Such mark is representative of the inclination of the casing 10 from the vertical for obviously the marking stylus will form said mark in accordance with its position relative to the casing. Thus, the position of the mark with respect to the center of the record disk 25 will indicate the number of degrees of inclination from the vertical of the casing 10.

For imparting an axial reciprocation to the support or carrier 26 so as to move the record disk 25 into engagement with the marking stylus 19, an operating mechanism is mounted within the lower section 12 of the casing 10. This section also houses a timing or clock mechanism T which is of the usual construction. The operating mechanism, which will be hereinafter described, includes an actuating rod 27 which has its upper end secured to the support or carrier 26, as is fully shown in Figures 2 and 3. The rod 27 extends upwardly through an opening 28 provided in the bottom 13b of the coupling element 13 and projects into the upper section 11 of the casing. The lower end of the rod has connection with the operating mechanism, as will be hereinafter explained, whereby the support or carrier is moved upwardly into engagement with the marking stylus.

The arrangement is such that the operating mechanism is controlled in its actuation by the timing mechanism T. The timing mechanism is set so that a predetermined time will elapse before operation will occur and thus, a sufficient time is permitted to lower the entire device into a well bore and locate the same at a desired position therein. When the operating mechanism is actuated, the carrier or support is moved upwardly so as to engage the record disk with the marking stylus and form a mark or dot on said record disk, which mark is representative of the number of degrees of inclination of the casing. After engagement with the marking stylus, the support or carrier is again returned to its lowered position, as shown in Figure 1. A predetermined time is then permitted to elapse, this period being relatively short, after which the operating mechanism again raises the support into engagement with the marking stylus to form a second mark on the record disk 25. If the plumb bob is at rest upon the first upward movement of the carrier or support 26 and remains at rest during the period of time between the two operations of the carrier, then the second mark will be superimposed upon the first mark so that only a single indication is had. However, if the plumb bob is not at rest during the time elapsed between the two marking operations, then two separate indications will be produced. Thus, the operator can immediately determine whether or not the plumb bob was immovable during the recording and therefore, an accurate indication is secured.

Figure 2:
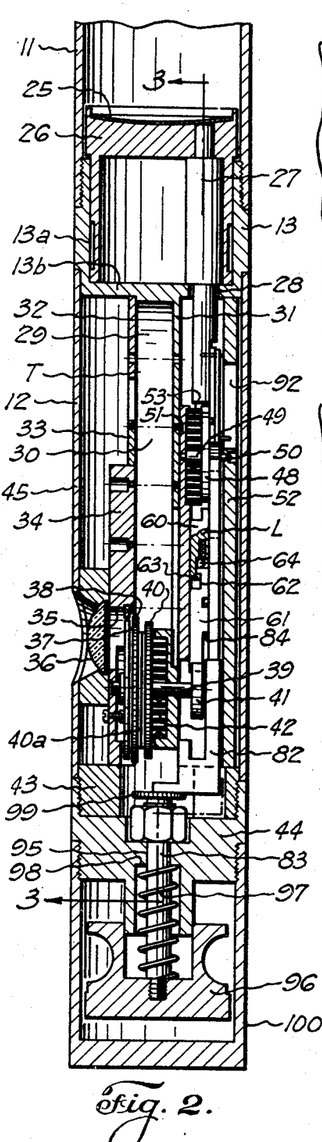
Figure 2 is an enlarged, transverse, vertical, sectional view, taken on the line 2—2 of Figure 1 and showing the operating mechanism, the details of the usual timing mechanism being omitted.

As has been stated, the operating mechanism for imparting reciprocation to the carrier or support 26, as well as the timing or clock mechanism is mounted in the lower section 12 of the casing. The clock mechanism includes a body portion 29 which has the coupling element 13 preferably made integral with its upper end. The body is recessed, as indicated at 30 for receiving the various gear trains (not shown) of the clock mechanism and this recessing of the body forms vertical standards or supports 30a at each side of said body, said supports being connected together by an integral rear wall 31 (Figure 2). The front wall of the body 29 of the clock mechanism is closed by plates 32, 33 and 34 (Figure 4) which are suitably attached to the vertical side standard 30a by screws. A window 35 is formed in the plate 34 and is covered by a suitable lens 36. An indicating dial 37 which is attached to the resetting gear 38 of the clock mechanism has a portion thereof visible through the lens 36 and window 35. The resetting gear 38 is fixed on the main shaft 39 of the clock mechanism and is adapted to be connected with the drive gear 40 of said clock mechanism by clutch plates 40a, such connection being made in the usual manner. The main spring 42 of the clock mechanism surrounds the drive shaft 39 and is adapted to drive the gear 40 and shaft 39. Of course, the timing gears which are mounted in the upper portion of the housing or body 29 and which are not shown, control the speed of rotation of the shaft 39. A timing cam 41 is mounted on the outer end of the clock shaft 39 and this cam is rotated at a predetermined speed by the clock mechanism.

The lower end of the body 29 of the clock mechanism T is provided with an integral collar or ring 43 and this ring is adapted to be threaded within a coupling block 44. A cylindrical housing 45 is confined between the coupling elements 13 and the coupling block 44 and completely houses both the timing mechanism and the operating mechanism, which will now be explained.

The actuating rod 27 which imparts reciprocation to the support or carrier 26 has its lower end extending downwardly into the lower section 12 of the casing, this lower end of the rod being disposed adjacent the rear wall 31 of the body of the clock mechanism, as is clearly shown in Figure 2. A pivoted operating lever 46 has its upper end pivotally connected by means of a pin 47 to the lower end of said rod. The lower portion of the operating lever depends below the rod 27 and is contiguous to the outer face of an actuating disk 48. The actuating disk is formed with a hub 49 which is fixed on a stub shaft 50 and the ends of said stub shaft are journaled in suitable bearings or openings which are formed in supporting plates 51 and 52. The plate 51 is secured to the rear wall 31 of the body of the clock mechanism and is suitably recessed, as is clearly shown in Figure 3 to accommodate the various working parts of the mechanism. The plate 52 is fastened to the plate 51 (Figure 5) and manifestly, the lower portion of the operating rod 27, the operating lever 46 and the actuating disk 48 are confined between the plates 51 and 52.

Figures 3, 16, 17:
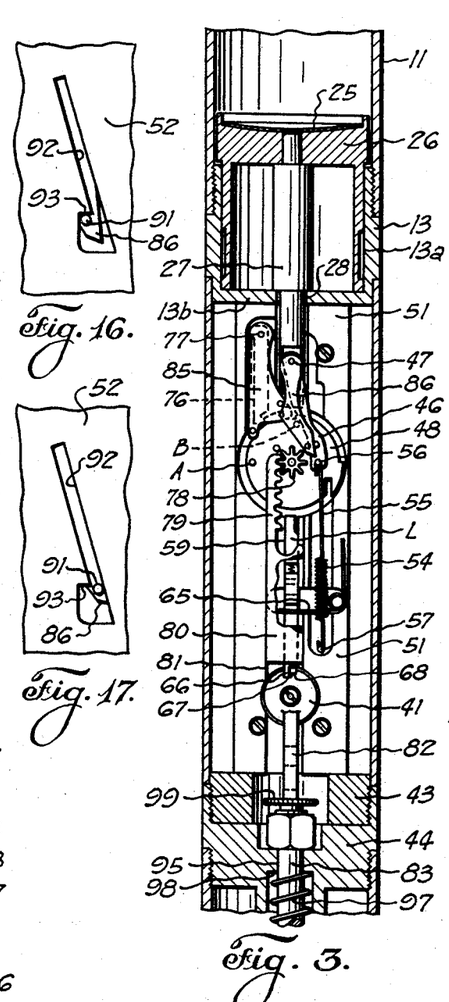
Figure 3 is a transverse, vertical sectional view, taken on the line 3—3 of Figure 2.
Figure 16 is a detail elevation of the guide and locking slot of the operating mechanism and illustrating the pin of the locking cam in the lower offset portion of said slot.
Figure 17 is a view, similar to Figure 16, with the pin moved out of alinement with the offset and in a position capable of vertical travel in the slot.
Figure 7:
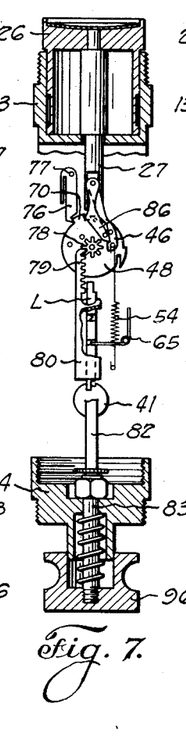
Figure 8:
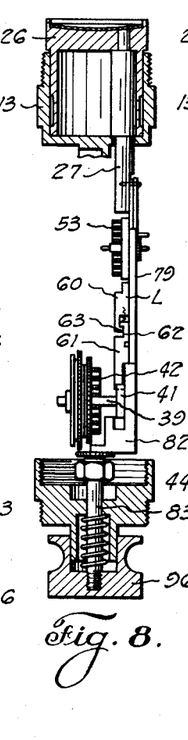

A flat spring 53 has one end secured to the hub 49 of the actuating disk 48 and is wound around said hub, the opposite end of said spring being suitably fastened to the supporting plate 51. The spring is so arranged as to constantly urge the disk toward a rotation in a counter-clockwise direction in Figures 3 and 7; obviously, the spring is wound, as will be explained, by rotating the disk in a clockwise direction (Figures 3 and 7).

Since the operating lever 46 has its upper end pivotally connected with the operating rod 27, it will be evident that when said lever is moved upwardly, the rod will be raised to impart a lifting movement to the record disk carrier or support 26, whereby the latter is moved into engagement with the marking element or stylus. The operating lever is normally held in a lowered position by means of a coiled spring 54, which spring has an upwardly extending portion 55 which is secured to an outwardly projecting lug or pin 56 on the lower portion of the lever 46 (Figure 3). The lower end of the spring is secured to a lug or pin 57 which is mounted in the supporting plate 51 and manifestly, the spring exerts its pressure to constantly pull the operating lever and the operating rod 27 attached thereto, toward a lowered position.

For imparting a lifting movement to the lever 46 against the tension of the spring 54, outwardly projecting pins A and B are mounted on the actuating disk 48 and these pins are located near the periphery of the disk and in spaced relation to each other. When the actuating disk 48 is in a set position prior to the reciprocation of the record carrier 26 and in readiness for the marking operation, the disk and operating lever 46 are in the position shown in Figure 11. At this time, the pin A on the disk is immediately below the lower end of the operating lever, while the pin B is spaced some distance from the first pin A. At this time, the spring is tending to rotate the disk in a counter-clockwise direction in Figure 11 but, as will be explained, the disk is locked against actuation by a locking bar which is controlled by the timing mechanism. At a predetermined time, the actuating disk is released to permit a rotation of said disk, such rotation being accomplished by the spring 53. As the rotation in a counter-clockwise direction occurs, the pin A which is in engagement with the lower end of the lever 46 causes an upward movement of the lever against the tension of the spring 54. Such upward movement of the operating lever results in an upward movement of the record carrier or support 26 through the operating rod 27.

Figure 14:
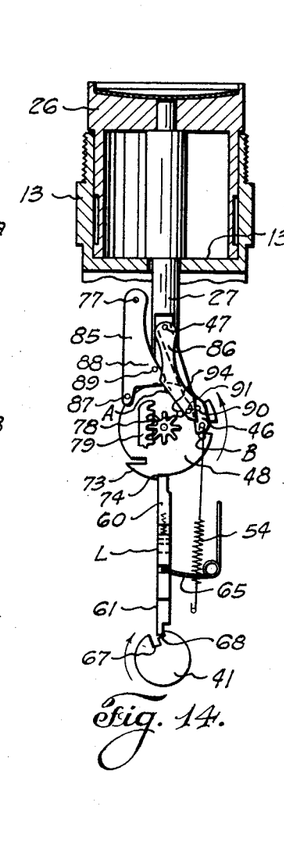

Rotation of the disk continues until the pin A has moved from beneath the lower end of the operating lever 46, as is shown in Figure 14, at which time the lever 46 is again returned to a lowered position by means of the spring 54. At this time, the disk is again locked against further actuation. As the rotation of the disk is halted and the lever 46 is returned to a lowered position, the pin B has been moved around so that said pin now engages the lower end of the lever, as is clearly shown in Figure 14. After a predetermined lapse of time, the timing mechanism again releases the disk 48 and permits the continued counterclockwise rotation. During such continued rotation, the pin B which is engaging the lower end of the lever causes an upward movement of the lever and results in the carrier or support 26 being raised to again engage the marking stylus. Therefore, in one revolution of the actuating disk 48, the carrier or support is moved upwardly at predetermined time intervals, whereby the record 25 which is carried by the support 26 is engaged with the marking stylus at two successive periods. In this manner, two distinct marks are formed on the record 25 and if the plumb bob is moving and is not completely at rest, the two individual marks will appear at different positions on the record. If the plumb bob is at rest and has remained so throughout the marking operation, the two marks will be superimposed, one upon the other, to provide only a single indication. Thus, the operator can immediately ascertain whether or not an accurate indication has been made.

For locking the actuating disk 48 against rotation until the desired time, a latching element L is provided, and this element is disposed within a suitable guide way 59 which is formed in the plate 51. The latching element, as is clearly shown in Figures 2 and 3 is disposed between the actuating disk 48 and the timing cam 41, which cam is mounted on the clock shaft 39. The latching element includes an upper latching bar 60 and a lower latching bar 61, which bars are interconnected by means of recesses 62 and lugs 63. The ends of the bars 60 and 61 are normally held in spaced apart by a coiled spring 64 which is interposed therebetween. The lower latching bar 61 is constantly urged downwardly by means of a wire spring 65, so that its lower end engages the periphery of the timing cam 41 and this lower end of said latching bar is reduced to provide a lug 66 which is adapted to engage within a notch 67 formed in the periphery of the timing cam 41. An offset or shoulder 68 is provided in the notch 67 so that in effect, a double notch of different depths is provided in the periphery of the timing cam. When the lug 66 is riding on the periphery of the timing cam 41, the upper end of the latching element L is arranged to coact with the periphery of the actuating disk 48, as will now be explained.

Figure 13:
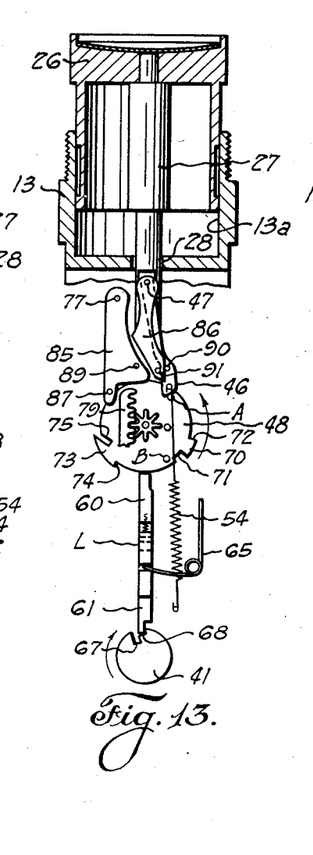
Figure 15:
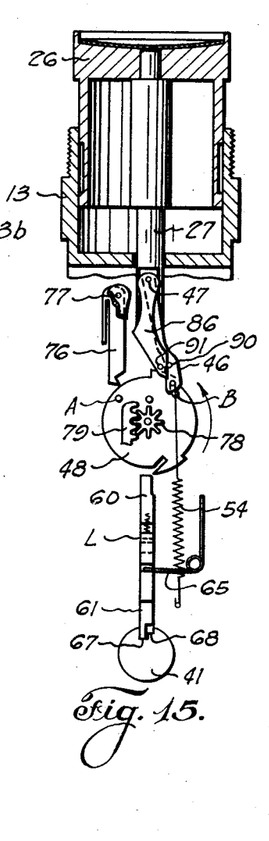
Figure 23:
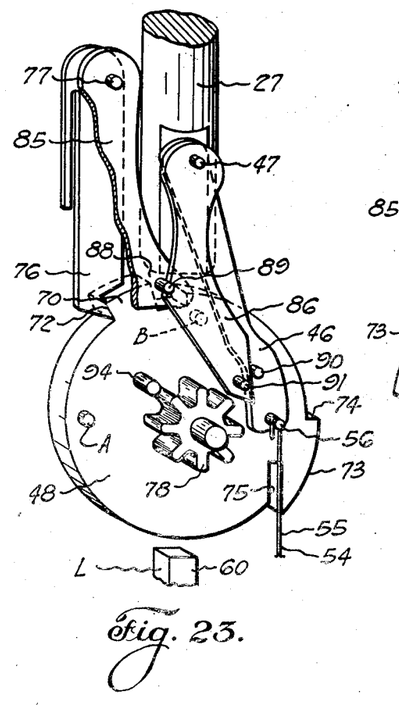
Figure 23 is an enlarged isometric view of the actuating disk and the operating levers associated therewith, the parts being in a locked position following operation and prior to resetting.
Figure 24:
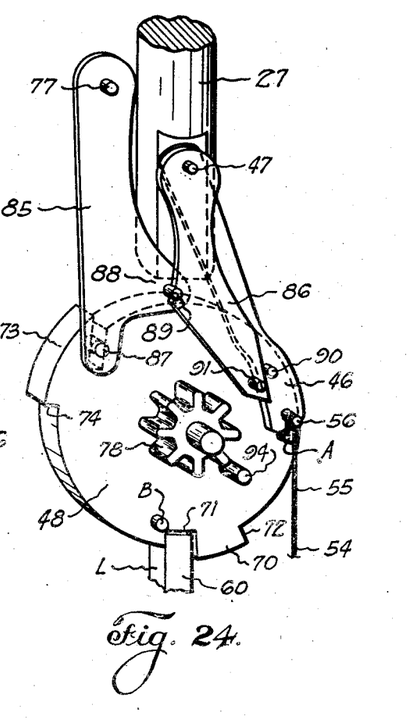
Figure 24 is a similar view with the parts in a latched set position ready for operation.

The actuating disk 48 is formed with a radially extending lug 70 and adjacent to this lug is a recess or notch 71 within which the upper reduced end of the latch bar 60 of the element L is adapted to engage. Obviously, the provision of the lug 70 provides a radially disposed shoulder 72 on the periphery of the cam. Spaced from the recess 71 is an extension or keeper 73 which is formed integral with the actuating disk and this extension provides a radial shoulder 74 on the periphery of the cam. An inwardly extending slot 75 is cut in the actuating disk adjacent the opposite end of the extension or keeper 73 and the purpose of this slot will be hereinafter set forth. The actuating pin A which coacts with the operating lever 46 is located in advance of the lug 70 on the disk, as is clearly shown in Figures 13 to 15, while the actuating pin B on said disk is disposed adjacent the recess 71.

Figure 11:
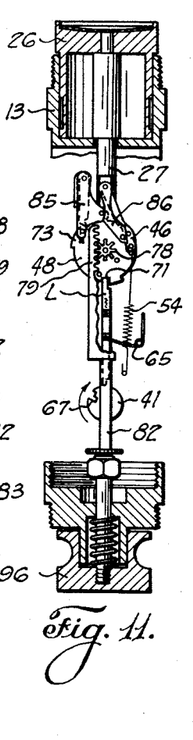
Figure 12:
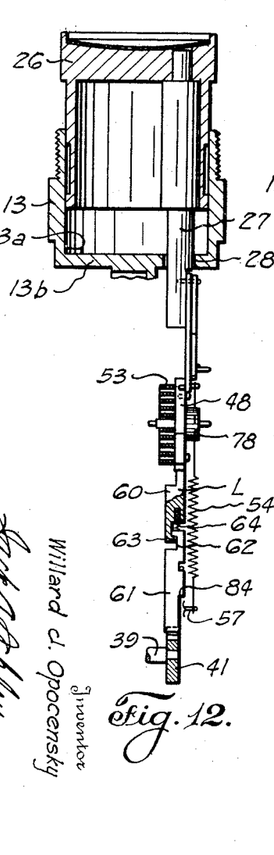

When the device has been set and prior to the reciprocation of the record support or carrier 26, the parts are in the position shown in Figure 11. At this time, the upper end of the latching element L is engaged within the recess 71 of the actuating disk and the lower end of said latching element is riding on the periphery of the timing cam 41. Since the timing cam is controlled by the clock mechanism, a predetermined time must elapse before the notch 67 in said timing cam is moved beneath or into alinement with the latching element L. The timing cam rotates in a clockwise direction in Figure 11 and as soon as the cam moves to a position where the lower end of the latching element may drop downwardly into the shallow end of the notch 67 and onto the shoulder 68, the upper end of the latching element is disengaged from the recess 71. At this time, the spring 53 which actuates the disk 48 will immediately rotate said disk in a counter-clockwise direction whereby the pin A which is engaging beneath the actuating lever 46 will raise said lever and thereby impart an upward movement to the carrier or support 26.

Rotation of the disk in a counter-clockwise direction continues until the shoulder 74 strikes the upper end of the latching element L. It is noted that the latching element has not moved downwardly out of the path of the shoulder 74 because its lower end is engaging the shoulder 68 in the timing cam 41, as is clearly shown in Figure 13. Thus, the parts moved to the position shown in Figure 14 at which time further rotation of the cam is halted. In this position, the pin B on the actuating disk is engaging the lower end of the actuating lever 46 which has been returned to a lowered position by the action of the coiled spring 54.

The parts remain in the position shown in Figure 14 until the timing cam 41 has been further rotated by the clock mechanism so as to move the deep end of the notch 67 beneath the lower end of the locking element. As the lower end of the latching element moves off of the shoulder 68 and into said deeper end of the notch 67, the upper end of the latching element is moved downwardly out of the path of the shoulder 74 on the actuating disk, whereby the spring 53 may impart a continued counter-clockwise rotation (Figure 15) to the disk 48. As explained, such continued rotation will result in the pin B again imparting an upward movement to the actuating lever 46 and to the record carrier or support 26. The position of the various parts during this second upward movement of the carrier 26 is clearly illustrated in Figure 15.

The rotation of the actuating disk continues until the shoulder 72 which is formed by the extended lug 70 engages the lower end of a pivoted stop arm 76. As shown in Figure 3, the stop arm has its upper end pivoted on a pin 77 which is secured to the plate 51, said stop arm being located at one side of the depending operating rod 27. As soon as the disk engages the stop arm 76, as shown in Figure 7, further rotation of the disk is halted. In order to again operate the disk, it is necessary to reset the same and return the parts to the position shown in Figure 11.

For imparting a reverse rotation, that is a clockwise rotation, to the actuating disk 48 in order to reset the same, said disk is provided with a pinion 78 which is secured thereto and also to the stub shaft 50 on which the disk 48 is mounted. A gear rack 79 is in constant engagement with the pinion 78 and has its lower end enlarged as shown at 80, such enlarged lower end being slidable within a guide groove 81 which is formed in the supporting plate 51. The lower end of the gear rack is engaged by the upper end of an angular resetting element or member 82 which is capable of a vertical movement within the casing and which normally rests upon the upper end of a vertically movable resetting shaft 83 mounted within the coupling member 44 at the lower end of the device. As is clearly shown in Figure 2, the resetting member 82 extends contiguous to the outer face of the timing cam and when said member is lifted, the gear rack is raised to impart a clockwise rotation to the pinion 78, whereby a similar rotation is imparted to the actuating disk 48.

Figure 9:
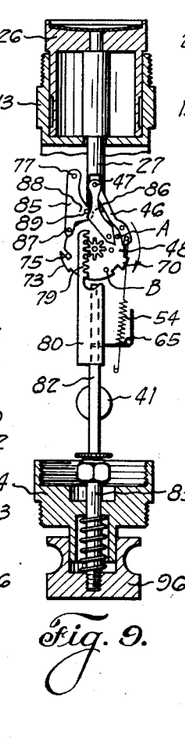
Figure 10:
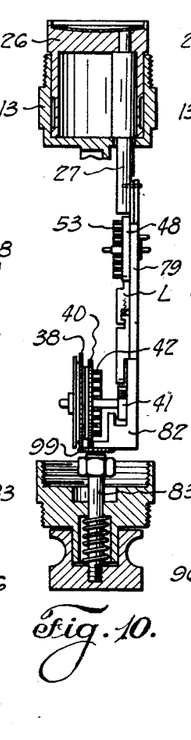

The upper end of the resetting element 82 which engages the lower end of the gear rack 79 has a greater transverse width than said gear rack whereby a portion of the upper end of said member extends beyond the inner surface of said gear rack. This extended portion of the resetting member 82 is adapted to engage a shoulder 84 which is formed on the lower latch bar 61 of the latching element L. With this arrangement, an upward movement of the resetting member 82 will first result in an upward movement of the gear rack so as to impart a clockwise rotation to the actuating disk. However, this initial movement of the gear rack does not effect an upward movement of the latch bar and it is only until the upper end of the resetting member 82 strikes the shoulder 84 of the latching element L that said latching element is lifted upwardly. By this time, the extension or keeper 73 of the actuating disk 48 has been moved around beyond the latching element L, that is, to the left of said element in Figures 3, 9 and 13. The continued upward movement of the resetting member 82 results in a simultaneous upward movement of the gear rack and the latch bar, whereby the lower end of the latching element L is disengaged from the notch 67 of the timing cam and the upper end of said element is moved into engagement with the periphery of the actuating disk.

In the operation of the upper and lower latch bars 60 and 61 of the latching element, said latch bars are in the position shown in Figure 7 immediately after the marking operation has been performed. At this time, the lower bar 61 is engaged within the notch 67 of the timing cam, while the upper bar 60 has its upper end disengaged or spaced from the periphery of the actuating disk 48. In resetting the mechanism, the gear rack is first moved upwardly to impart clockwise rotation to the disk so as to move the extension or keeper 73 on said disk beyond or to the left of the latching element L in Figure 9. Continued upward movement of the resetting member 82 results in the lower latch bar 61 moving upwardly so as to disengage the lower end from the notch 67 in the timing cam. This upward movement is against the pressure of the wire spring 65 and also against the pressure of the coil spring 64 between the latch bars. At the same time, the upper end of the latching element engages the periphery of the actuating disk 48 and upon continued movement of the gear rack which results in a continued rotation of the disk, the recess 71 in said disk is alined with the upper end of the latching element and said latching element engages therein, as is shown in Figure 11. Thus, it will be seen that the single resetting member 82 results in lifting of the gear rack 79 to impart a clockwise or resetting rotation to the actuating disk 48 and at the same time, disengages the latching element L from the timing cam 41 and re-engages the upper end thereof with the locking recess 71 in said disk, whereby the parts are locked against actuation until such time as the latching element L may again drop downwardly into the notch of the timing cam.

It is desirable to positively lock the device against actuation during the lowering of the instrument into the well and prior to the operation thereof; it is also desirable that upward movement of the carrier or support 26 be prevented after the marking operation and while the device is being removed from the well. For this purpose, a locking pawl 85 and a locking lever 86 is provided. The locking pawl is pivoted on the pin 77 upon which the stop arm 76 is mounted. The pawl 85 extends downwardly and is provided with a rearwardly extending pin 87 at its lower end and this pin overhangs the periphery of the actuating disk 48 so as to extend into the path of the keeper 73 which is formed on said disk. When the disk has been reset and moved to the position shown in Figure 11, the rearwardly extending pin 87 on the locking pawl 85 engages within the slot 75 which is formed in the disk 48 adjacent the keeper 73 and the disk is utilized to move the locking pawl inwardly toward the depending operating rod 27.

An extension or ear 88 is formed integral with the locking pawl 85 and has an outwardly extending pin 89 formed thereon. This pin is arranged to engage one side of the locking lever 86 which lever has its upper end pivoted on the pin 47 which also has the actuating lever 46 pivoted thereto. The locking lever 86 overlies the actuating lever 46 and obviously when the keeper 73 engages the pin 87 of the locking pawl to move said pawl inwardly toward the lever 86, the lever 86 is swung so as to overlie the actuating lever 46, as is clearly shown in Figure 11.

For connecting the locking lever with the actuating lever, the latter is provided with an outwardly extending pin 90 which is located in the path of the locking lever and which is held in constant engagement with the edge of the locking lever by the spring 54, whereby a swinging of the locking lever imparts movement to the actuating lever. The swinging movement of the locking lever 86 which is disposed between the locking pawl 85 and the actuating lever 46 is limited by the coaction of an outwardly extending pin 91, which is secured to the lower end of said locking lever, with an inclined guide slot 92 formed in the outer plate 52 (Figures 5, 16, and 17). The lower end of the slot 92 is enlarged and offset to provide a shoulder 93 near the lower portion thereof.

When the apparatus has been reset and is in readiness to perform a marking operation, the parts are in the position shown in Figure 11, this being the position as the device is lowered through the well bore. At this time, the keeper 73 is engaged with the pin 87 of the locking pawl and has swung said pawl against the locking lever 86, holding said lever against the outwardly extending pin 90 of the actuating lever 46. This swinging of the locking lever has moved the pin 91 on the lower end of said locking lever outwardly from beneath the shoulder 93 of the inclined guide slot 92 so that said pin will frictionally engage the inclined wall of the slot, as shown in Figure 17. The engagement of the locking lever has swung the actuating lever to the position shown in Figure 11, whereby the lower end of said lever is immediately above the actuating pin A on the actuating disk 48. So long as the parts remain in this position, it is impossible to move the actuating lever 46 upwardly because the engagement of the pin 91 of the locking lever with the inclined guide slot 92 will prevent such upward movement. In other words, the locking pawl frictionally binds the various parts against movement and it is impossible for the carrier or support 26 to be moved upwardly, which movement might be caused by undue shock or vibration as the device is being lowered into the well. It is to be remembered that there is no positive connection between the actuating disk 48 and the actuating lever 46 and therefore, the disk may remain in a locked position by the engagement of the latching element L within its recess 71 and yet, the carrier 26 might move upwardly due to excess jarring. The frictional locking arrangement set up by the locking pawl 85 and the locking lever 86 prevents such upward movement and obviates the danger of the support being moved upwardly prematurely to mark the record 25 carried by said support.

When the latching element L is moved downwardly by its lower end engaging the shallow end of the notch or shoulder 68 in the timing cam 41, as has been explained, the actuating disk is released and rotates in a counter-clockwise direction from the position shown in Figure 11. Such counter-clockwise movement disengages the keeper 73 from the locking pawl 85 and permits said pawl to swing away from the locking lever 86. Since the actuating pin A is in engagement with the lower end of the actuating lever 46, the counter-clockwise rotation of the disk raises this lever and thereby raises the operating rod 27 and support 26. During such movement, the locking lever moves upwardly with the actuating lever, being guided in its movement by the guide pin 91 riding upwardly within the guide slot 92.

Rotation of the actuating disk continues until the shoulder 74 on said disk strikes the upper end of the latching element L and by this time, the parts have moved to the position shown in Figure 14 with the pin A on said disk clearing or moving from below the actuating lever 46. The spring 54 secured to said actuating lever pulls the same downwardly and engages the lower end thereof with the second actuating pin B. In order to prevent the locking lever 86 from swinging inwardly so that its pin 91 will engage the shoulder 93 and thereby prevent the second actuation, a third outwardly extending pin 94 is provided on the actuating disk 48, and this pin is arranged to engage the lower end of the locking lever so as to hold said lever in contact with the pin 91 of the actuating lever and also to prevent swinging of the locking lever toward a locking position.

The pin 94 is so located as to engage the locking lever at substantially the same time that the actuating pin A moves from beneath the lever 46 and the latching element L moves into engagement with the shoulder 74 of the disk. This position of the parts is clearly shown in Figure 14 and said parts remain in such position until the latching element is again lowered by its lower end dropping into the deeper end of the notch 67 in the timing cam. When this occurs, a continued counter-clockwise rotation of the actuating disk 48 is permitted, with the result that the second actuating pin B imparts a second reciprocating movement to the support or carrier 26. Rotation of the disk 48 is finally halted by the engagement of the shoulder 72 on the disk with the stop arm 76, this position of the parts being illustrated in Figure 7.

Upon halting of the movement of the disk 48, the double marking operation has been completed and the locking lever 86, is returned toward a vertical position by means of the spring 54 through the lever 46 and pin 90. As the lever 86 reassumes a vertical position, the pin 91 at the lower end of said lever swings to the position shown in Figure 16, whereby the pin 91 engages the offset or shoulder 93 of the lower portion of the guide slot 92. Obviously, when the locking lever is in this position any upward movement of said lever or of the operating rod 27 of the carrier 26 is prevented. Thus, as the device is withdrawn from the well bore, a positive lock against any upward movement of the carrier or disk which would form an inaccurate indication or mark on the record 25, is prevented.

After operation of the device and with the parts in the position shown in Figure 7, the resetting of the disk, as explained, will result in a clockwise rotation of said disk. Such clockwise rotation moves the parts to the position shown in Figure 11, whereby the keeper 73 is again engaged with the locking pawl 85 and said pawl engages the locking lever 86 to swing the same and thereby disengage the pin 91 from beneath the locking shoulder 93 of the guide slot 92. At the same time, the locking lever swings into engagement with the pin 90 of the actuating lever and moves said actuating lever into the path of the actuating pin A of the disk 48. At the same time, the resetting results in a re-engagement of the upper end of the latching element L with the recess 71 of the disk, as has been explained.

After the marking operation has been completed, the resetting of the mechanism is accomplished through the angular resetting element 82, as has been described. It is of course necessary to reset the timing cam 41 when the operating mechanism is reset and for this purpose, the resetting stem 83 is provided. As is clearly shown in Figure 2, the stem 83 extends through an opening 95 in the coupling block 44 and has a knurled hand knob 96 on its lower end. A coiled spring 97 which surrounds the stem is confined between the knob 96 and an internal shoulder 98 which is formed within the block and this spring constantly urges the stem toward a lowered position. The upper end of the stem is formed with a resetting pinion 99 which is secured thereto and this pinion has the lower end of the resetting member 82 normally resting thereon. A cap member 100 which is threaded onto the block 44 normally encloses the knob 96 and the resetting stem 83.

When it is desired to reset the mechanism, the cap 100 is removed and the stem 83 is moved upwardly so as to raise the resetting member 82 which results in a movement of the gear rack and an upward movement of the latching element L to disengage the lower end of said element from the notch 67 of the timing cam. The setting gear 38 of the clock mechanism is located in a plane above the teeth of the resetting pinion 99 so that when said pinion is moved upwardly its teeth will engage the teeth of the gear 38. Thus, when the resetting stem 83 is moved upwardly it will first perform the resetting of the operating mechanism and will then engage the setting gear 38 of the clock mechanism. A subsequent rotation of the stem 83 will result in a rotation of the setting gear 38 through the pinion 99. As explained, the gear 38 is fixed on the shaft 39 which carries the timing cam 41 and obviously, a rotation of the gear will rotate the said cam. The cam may be adjusted in any desirable manner so as to require a predetermined lapse of time before the notch 67 of said cam will again move beneath the latching element L. As has been pointed out, the setting gear 38 carries a dial 37 which is visible through the window 35 and by observing the dial, the operator may rotate the gear 38 to set the timing cam in any desired manner.

Figure 6:
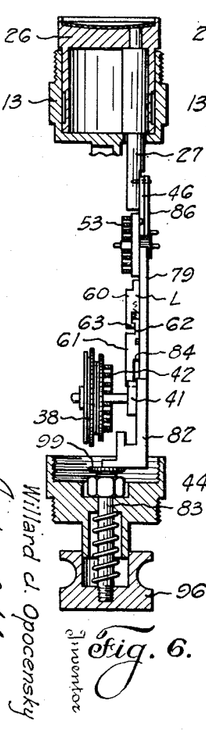

In the operation of the device, assuming that the same is to be prepared to obtain a reading, the parts are in the position shown in Figures 6 and 7, to which position they have been moved upon the previous recordings or marking operations. At this time, the locking pawl 85 is swung away from the locking lever 86 and said lever has moved toward a vertical position, whereby its locking pin 91 is disposed below the shoulder 93 at the lower end of the guide slot 92. The spring 54 which is attached to the actuating lever 46 has pulled said lever to its lowermost position.

The device is of course, at the surface of the well and to accomplish the resetting, the resetting stem 83 is depressed under tension of the spring 97, whereby the resetting member 82 is lifted. The lifting of the resetting member 82 results in raising the gear rack 79 to impart a rotation in a clockwise direction (Figures 7 and 9) to the actuating disk 48 through the pinion 78. Continued upward movement of the resetting member 82 results in a lifting of the lower latch bar 61 to disengage this latch bar from the notch 67 of the timing cam 41. By the time that the latching element L has been disengaged from the timing cam and its upper end moved into engagement with the periphery of the actuating disk 48, the keeper 73 on the actuating disk has moved beyond the latching element L, as is clearly shown in Figure 9. During the clockwise movement of the actuating disk toward its resetting position, the actuating pins A and B on said disk merely by-pass the actuating lever 46 by swinging said lever out of their path, such swinging being permitted because of the spring 54.

The clockwise rotation of the disk continues until the recess 71 in the periphery of the disk moves into alinement with the upper end of the latching element L, as shown in Figure 11. By this time, the keeper 73 has engaged the pin 87 of the locking pawl 85 and has swung said pawl inwardly against the locking lever 86, whereby the locking lever has moved toward the actuating lever a sufficient distance to disengage the pin 91 on the locking lever from beneath the shoulder 93 of the inclined guide slot 92. The swinging of the locking lever has caused the same to engage the extending pin 90 on the actuating lever 46 and at this time, the upward movement of the locking lever and actuating lever is prevented because of the engagement of the pin 91 on the locking lever with the inclined edge of the guide slot.

After the actuating disk has been reset to the position shown in Figure 11, the resetting stem has moved a sufficient distance within the casing to engage its pinion 99 with the resetting gear 38 of the clock mechanism. The stem is then rotated by means of the hand knob 96 to properly set the timing cam 41 and to locate its notch 67 a proper distance from the latching element L. The parts remain in this position during the lowering of the device through the well bore. It is pointed out that the locking pawl is maintained against the locking lever 86 and the locking lever remains in engagement with the pin 90 of the actuating lever, whereby these parts are frictionally held against upward movement. This frictional lock prevents the carrier or support 26 from accidentally moving upwardly to contact with the marking stylus during the lowering of the device. It is pointed out that there is no fixed connection between the actuating disk 48 and the carrier or support 26 and therefore, in resetting the disk 48, it is not necessary to impart a reciprocation to the marking element. This arrangement obviates the danger of damaging any of the working parts during the resetting of the device.

The timing or clock mechanism T is properly set so as to provide sufficient time for the instrument to be lowered to its proper position in the well bore. Upon reaching this position, the instrument is permitted to remain at rest until the clock mechanism has operated a sufficient time to rotate the timing cam 41 to a position with its notch 67 alined with the lower latch bar 60 of the latching element L. The timing cam rotates in a clockwise direction (Figure 13) so that the latching element first falls downwardly into the shallow portion of the notch and rests upon the shoulder 68. This slight downward movement of the latching element L disengages the upper end thereof from the recess 71 in the disk 48 and said disk immediately is rotated in a counter-clockwise direction by its spring 53. Such rotation results in the actuating pin A imparting a lifting movement to the actuating lever 46 and since said lever is connected to the operating rod, the carrier or support 26 which carries the record is moved upwardly so that the record is engaged with the marking stylus to form a mark or indication thereon. Due to the universal mounting of the plumb bob, any inclination of the outer casing will result in the marking element being off center of the record carried by the support 26 and obviously the mark so formed on the record by the stylus will be an indication of the number of degrees of inclination from the vertical of the outer casing.

The actuating disk continues to rotate until the shoulder 74 strikes the upper end of the latching element L. At this time, the parts have moved to the position shown in Figure 14 and the actuating pin A has moved from beneath the actuating lever 46, the coil spring 54 having returned the actuating lever, operating rod 27 and support 26 to a lowered position. At this time, the third actuating pin 94 on the disk has engaged the lower end of the locking lever 86 and has maintained the locking lever in a position engaging the pin 90 on the actuating lever 46. Thus, the extending guide pin 91 on the locking lever is maintained within the slot 92 and cannot swing back below the shoulder 93 of the said slot; also, the engagement of the locking lever with the actuating lever 46 maintains the actuating lever in the path of the second actuating pin B on the disk 48.

The parts remain in this position (Figure 14) until the timing mechanism has actuated the timing cam and has moved the deeper end of the notch 67 below the latching element L, at which time the latching element again moves downwardly and its upper end moves out of the path of the shoulder 74 on the periphery of the actuating disk 48. When this occurs, the spring immediately continues the counter-clockwise rotation of the disk and through the actuating pin B again imparts an upward movement to the actuating lever and therefore to the support or carrier 26 to form a second mark on said carrier. If the plumb bob has remained at rest during the entire operation, both marks on the record 25 will be superimposed, one upon the other, to form a single indication. If there has been any swinging movement of the plumb bob between the time of the first marking operation and the second marking operation, then two separate indications will appear on the record 25.

After the carrier or support has been actuated the second time, the actuating pin B moves from beneath the lever 46 and the disk continues to rotate until the shoulder 72 engages the stop arm 76. At this time, further rotation of the disk is impossible and the parts have again returned to the position shown in Figure 7 ready for the resetting operation hereinbefore described. As has been previously pointed out, after the second marking operation is complete, the locking lever 86 is permitted to swing toward a vertical position, whereby its pin 91 may swing below the shoulder 93 at the lower end of the guide slot 92. In such position, the lever prevents upward movement of the actuating lever 46 and the support 26, whereby the danger of the carrier or support being moved upwardly by shock or jar during the removal of the device from the well, is obviated.

It may sometimes occur that the latching element L will not be raised sufficiently to completely clear the notch 67 within the timing cam 41, in which case a resetting of the timing mechanism could not occur without damage to some part of said mechanism. In Figures 18 to 22 a slightly modified form of timing cam is illustrated. In this form, the main clock shaft 39 is provided with a square end 101 and a timing cam 41a similar to the cam 41 is mounted on the outer end of the squared portion 101, being retained thereon by a nut 102. The cam is provided with deep notch 67a and an offset or shoulder 68a. The cam 41a has a circular bore or opening 103, whereby it is freely rotatable upon the squared portion 101 of the control shaft. A releasing disk 104 having a square opening therein is keyed or fixed on the shaft 39 so as to be rotatable therewith. This disk is provided with a recess or notch 105 which has one upper end curved or rounded as indicated at 106, Figure 19. The disk 104 is connected with the cam 41a by means of a spring 107 which is wound around the shaft and which has its opposite ends connected to the disk and the cam, respectively. The cam and disk are further connected by means of a pin or screw 108 which is threaded through the cam 41a and which engages an arcuate slot 109 in the disk 104. Normally, the spring 107 holds the screw at one end of the slot 109 so as to hold the cam and disk in the position shown in Figure 18, with the notch 105 alined with the notches 67a and 68a.

In the event that the latching element L is not lifted completely clear of the timing cam 41a, as shown in Figure 19, a counter-clockwise rotation of the shaft 39 which is effected through the setting gear 38 will result in the vertical edge of the notch 67a striking the lower end of said latching element. When this occurs, the timing cam 41a will be prevented from further rotation but because of the pin and slot connection, the continued rotation of the shaft 39 will impart a rotation to the disk 104, with the result that the rounded edge of the notch 105 of the disk will engage the lower end of the locking element and will thereby raise the same. Of course, as soon as the latching element engages the periphery of the disk and cam, the spring 107 will immediately return these parts to their original or normal position. In this manner, damage to the timing mechanism because of failure of the latching element to be raised will be obviated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An inclination indicating device including, a casing adapted to be lowered into a well bore so as to assume the same inclination as said bore, a marking element within the casing suspended for universal movement therein, a movable support for a record member below the marking element and normally spaced therefrom, a single operating means disconnected from and adapted to engage the support for imparting movement to the support to move the same into engagement with the marking element and means for actuating the operating means at spaced time intervals whereby the support is engaged with the marking element more than one time in a cycle of operation.

2. An inclination indicator including, a casing, a plumb bob within the casing and having a marking element on its lower end, a record member below the plumb bob normally spaced therefrom, and operating means including a rotatable actuating element for moving the record member upwardly into engagement with the marking element at predetermined spaced time intervals during one revolution of said element, whereby a plurality of indications are made on said member, said indications being superimposed one upon the other so long as the plumb bob remains at rest throughout the actuation of the operating means.

3. An inclination indicator as set forth in claim 2, with a clock-controlled locking mechanism associated with the operating means for preventing operation thereof until a predetermined time.

4. An inclination indicating device including, a casing adapted to be lowered into a well bore so as to assume the same inclination as said bore, a marking element within the casing suspended for universal movement therein, a movable support for a record member below the marking element and normally spaced therefrom, operating means for imparting movement to the support to move the same into engagement with the marking element, a spring-actuated means for actuating the operating means, a latching element for preventing actuation of the actuating means, and a time-controlled means associated with the latching means for releasing the same at spaced time intervals, whereby the actuating means is actuated at spaced time intervals to move the support into engagement with the marking element.

5. An inclination indicator, of the character described, including, a casing, a plumb bob within the casing and having a marking element on its lower end, a movable record carrier below the marking element and normally spaced therefrom, operating means for imparting movement to the carrier to move the same into engagement with the marking element, and rotatable actuating means engageable with the operating means for effecting operation thereof at spaced time intervals during a single revolution of said actuating means, whereby the carrier is engaged with the marking element at predetermined time intervals.

6. An inclination indicating device including, a casing adapted to be lowered into a well bore so as to assume the same inclination as said bore, a marking element within the casing suspended for universal movement therein, a movable support for a record member below the marking element and normally spaced therefrom, operating means for imparting movement to the support to move the same into engagement with the marking element, an operating rod attached to the support, and actuating means for engaging said rod for reciprocating said rod at predetermined spaced time intervals whereby the support is moved upwardly into engagement with the marking element each time that the rod is reciprocated.

7. The inclination indicating device as set forth in claim 6, together with a timing mechanism for controlling the operation of the actuating means.

8. An inclination indicating device including, a casing adapted to be lowered into a well bore so as to assume the same inclination as said bore, a marking element within the casing suspended for universal movement therein, a movable support for a record member below the marking element and normally spaced therefrom, an operating rod attached to the support, operating means disconnected from and adapted to engage the operating rod for imparting reciprocating movement to the support to move the same into engagement with the marking element, and means for locking the operating rod and support against reciprocating movement independent of the actuating means and prior to the actuation of said means.

9. An inclination indicating device including, a casing adapted to be lowered into a well bore so as to assume the same inclination as said bore, a marking element within the casing suspended for universal movement therein, a movable support for a record member below the marking element and normally spaced therefrom, operating means for imparting movement to the support to move the same into engagement with the marking element, an operating rod attached to the support, means for locking the operating rod and support against reciprocating movement independent of the actuating means and prior to the actuation of said means, and additional locking means for locking said rod and support against movement subsequent to the actuation of the actuating means.

10. A device for determining the inclination of a well bore including, a casing adapted to be lowered into a well bore so as to assume the same inclination as said bore, a marking element within the casing suspended for universal movement therein, a record carrier below the marking element and normally spaced therefrom, an operating lever connected to the carrier and arranged to be reciprocated to impart upward movement to the carrier to engage the same with the marking element, a rotatable actuating member, and spaced elements on said member adapted to successively engage and reciprocate the operating lever to impart a double reciprocating movement to the carrier during one revolution of said member.

11. An inclination indicating device as set forth in claim 10, with latching means for engaging the member to lock the same against movement, and a timing mechanism for controlling the latching means whereby the rotatable member is permitted to partially rotate to reciprocate the lever and then after a predetermined lapse of time is allowed to complete its rotation to again reciprocate said lever.

12. A device for determining the inclination of a well bore including, a casing adapted to be lowered into a well bore so as to assume the same inclination as said bore, a marking element within the casing suspended for universal movement therein, a record carrier below the marking element and normally spaced therefrom, an operating lever connected to the carrier and arranged to be reciprocated to impart upward movement to the carrier to engage the same with the marking element, a rotatable actuating member, outwardly extending projections on the member near the periphery thereof and spaced from each other and resilient means for maintaining the lower end of the lever in the path of the projections, whereby as the member is rotated the projections engage the lever to impart a double reciprocation to the lever and carrier upon one revolution of the member.

13. A device for determining the inclination of a well bore including, a casing adapted to be lowered into a well bore so as to assume the same inclination as said bore, a marking element within the casing suspended for universal movement therein, a record carrier below the marking element and normally spaced therefrom, an operating lever connected to the carrier and arranged to be reciprocated to impart upward movement to the carrier to engage the same with the marking element, a rotatable actuating member, outwardly extending projections on the member near the periphery thereof and spaced from each other, resilient means for maintaining the lower end of the lever in the path of the projections, whereby as the member is rotated the projections engage the lever to impart a double reciprocation to the lever and carrier upon one revolution of the member, and means for resetting the actuating member after actuation thereof, said projections swinging the lever out of their path against the tension of the resilient means during the resetting operation whereby the lever is not reciprocated during resetting.

14. As a sub-combination in an inclination indicating device, an actuating mechanism for imparting reciprocation to a record carrier including, an operating lever pivotally connected to the carrier, a spring-actuated rotatable disk having a pair of spaced projections thereon, means for maintaining the lower end of the lever in the path of the projections, whereby when the disk is rotated in a counter-clockwise direction the projections successively engage the lever to impart a double reciprocation thereto during one revolution of the disk, whereby the carrier is reciprocated, and a locking means associated with the actuating lever for locking the same against reciprocating movement independently of the actuating disk, whereby accidental reciprocation thereof is prevented.

15. An inclination indicator, of the character described, including, a casing, a plumb bob within the casing and having a marking element on its lower end, a movable record carrier below the marking element and normally spaced therefrom, operating means for imparting movement to the carrier to move the same into engagement with the marking element, and actuating means engageable with the operating means for effecting operation thereof at spaced intervals, whereby the carrier is engaged with the marking element at predetermined time intervals, said actuating means comprising a spring-actuated disk having means for engaging the operating means.

16. An inclination indicating device including, a casing adapted to be lowered into a well bore so as to assume the same inclination as said bore, a marking element within the casing suspended for universal movement therein, a movable support for a record member below the marking element and normally spaced therefrom, operating means for imparting movement to the support to move the same into engagement with the marking element, means for actuating the operating means at spaced time intervals whereby the support is engaged with the marking element more than one time in a cycle of operation, and means for preventing movement of the movable support by outside forces during raising and lowering of the device through the well bore.

17. An inclination indicator, of the character described, including, a casing, a plumb bob within the casing and having a marking element on its lower end, a movable record carrier below the marking element and normally spaced therefrom, operating means for imparting movement to the carrier to move the same into engagement with the marking element, actuating means engageable with the operating means for effecting operation thereof at spaced time intervals, whereby the carrier is engaged with the marking element at predetermined time intervals, and means for locking the carrier against movement prior and subsequent to the operation of the actuating means.

18. An inclination indicating device including, a casing adapted to be lowered into a well bore so as to assume the same inclination as said bore, a marking element within the casing suspended for universal movement therein, a movable support for a record member below the marking element and normally spaced therefrom, operating means for imparting movement to the support to move the same into engagement with the marking element, an operating rod attached to the support, actuating means for engaging said rod for reciprocating the rod at predetermined spaced time intervals whereby the support is moved upwardly into engagement with the marking element each time that the rod is reciprocated, a timing mechanism for controlling the operation of the actuating means, and means for resetting the actuating means and timing mechanism after operation thereof, the resetting of the actuating means being accomplished without reciprocating the operating rod, whereby the support is not moved during the resetting operation.

19. A device for determining the inclination of a well bore including, a casing adapted to be lowered into a well bore so as to assume the same inclination as said bore, a marking element within the casing suspended for universal movement therein, a record carrier below the marking element and normally spaced therefrom, an operating lever connected to the carrier and arranged to be reciprocated to impart upward movement to the carrier to engage the same with the marking element, a rotatable actuating member, spaced elements on said member adapted to successively engage and reciprocate the operating lever to impart a double reciprocating movement to the carrier during one revolution of said member, latching means for engaging the member to lock the same against movement, a timing mechanism for controlling the latching means whereby the rotatable member is permitted to partially rotate to reciprocate the lever and then after a predetermined lapse of time is allowed to complete its rotation to again reciprocate said lever, means for resetting the actuating member, latching means and timing mechanism, and means associated with the engagement between the timing mechanism and latching means for preventing damage to the timing mechanism during the resetting operation.

20. An inclination indicating device including, a casing adapted to be lowered into a well bore so as to assume the same inclination as said bore, a marking element within the casing mounted for universal movement therein, a movable support for a record member within the casing and normally spaced from the marking element, a rotatable operating means disconnected from and adapted to engage the support for imparting movement to said support to move the same into engagement with the marking element, and means for actuating the rotatable operating means at spaced time intervals, whereby the support is engaged with the marking element more than one time in a cycle of operation to accurately indicate that the marking element was at rest during the marking operation.

WILLARD J. OPOCENSKY.